United States Patent [19]

Parenteau

[11] Patent Number: 5,769,182
[45] Date of Patent: Jun. 23, 1998

[54] LUBRICANT SUPPLY SAFETY SYSTEM

[75] Inventor: Daniel Parenteau, Laval, Canada

[73] Assignee: Kvaerner Hymac Inc., Laval, Canada

[21] Appl. No.: 624,400

[22] PCT Filed: Oct. 13, 1994

[86] PCT No.: PCT/IB94/00314

§ 371 Date: Jun. 12, 1996

§ 102(e) Date: Jun. 12, 1996

[87] PCT Pub. No.: WO95/10729

PCT Pub. Date: Apr. 20, 1995

[30] Foreign Application Priority Data

Oct. 13, 1993 [SE] Sweden .................................. 9303372

[51] Int. Cl.$^6$ ............................. F16N 7/40; F16N 29/02; F16N 13/16
[52] U.S. Cl. ........................ 184/6.4; 184/6.22; 184/6.24; 184/27.2; 184/27.1; 184/104.1
[58] Field of Search .......................... 184/6.4, 108, 6.22, 184/6.24, 104.1, 104.3, 6, 27.1, 27.2; 60/405, 454, 456, 486; 417/426

[56] References Cited

U.S. PATENT DOCUMENTS 2,416,947  3/1947  Palm .
3,398,688  8/1968  Columbu et al. ........................ 417/426
4,237,993  12/1980  Jablonsky ................................. 60/405
4,444,292  4/1984  Brown et al. ............................ 184/6.4
4,976,335  12/1990  Cappellato .

FOREIGN PATENT DOCUMENTS 3522595   1/1986   Germany .
53-81842  7/1978   Japan .
60-211195 10/1985  Japan .
1065392   3/1989   Japan .
1244359   7/1986   U.S.S.R. .
1059304   2/1967   United Kingdom .

Primary Examiner—Christopher Verdier
Attorney, Agent, or Firm—Helfgott & Karas, P C.

[57] ABSTRACT

A lubricant supply safety system for a machine comprises a reservoir for lubricating oil, a hydraulic motor driving one or more feeder pumps supplying lubricating oil from the reservoir to various points in the machine, a first pump for supply of lubricating oil from the reservoir to drive the hydraulic motor under normal operating conditions, and a second pump driven by the machine for supply of lubricating oil from the reservoir to drive the hydraulic motor in the event of failure of the first pump.

8 Claims, 1 Drawing Sheet

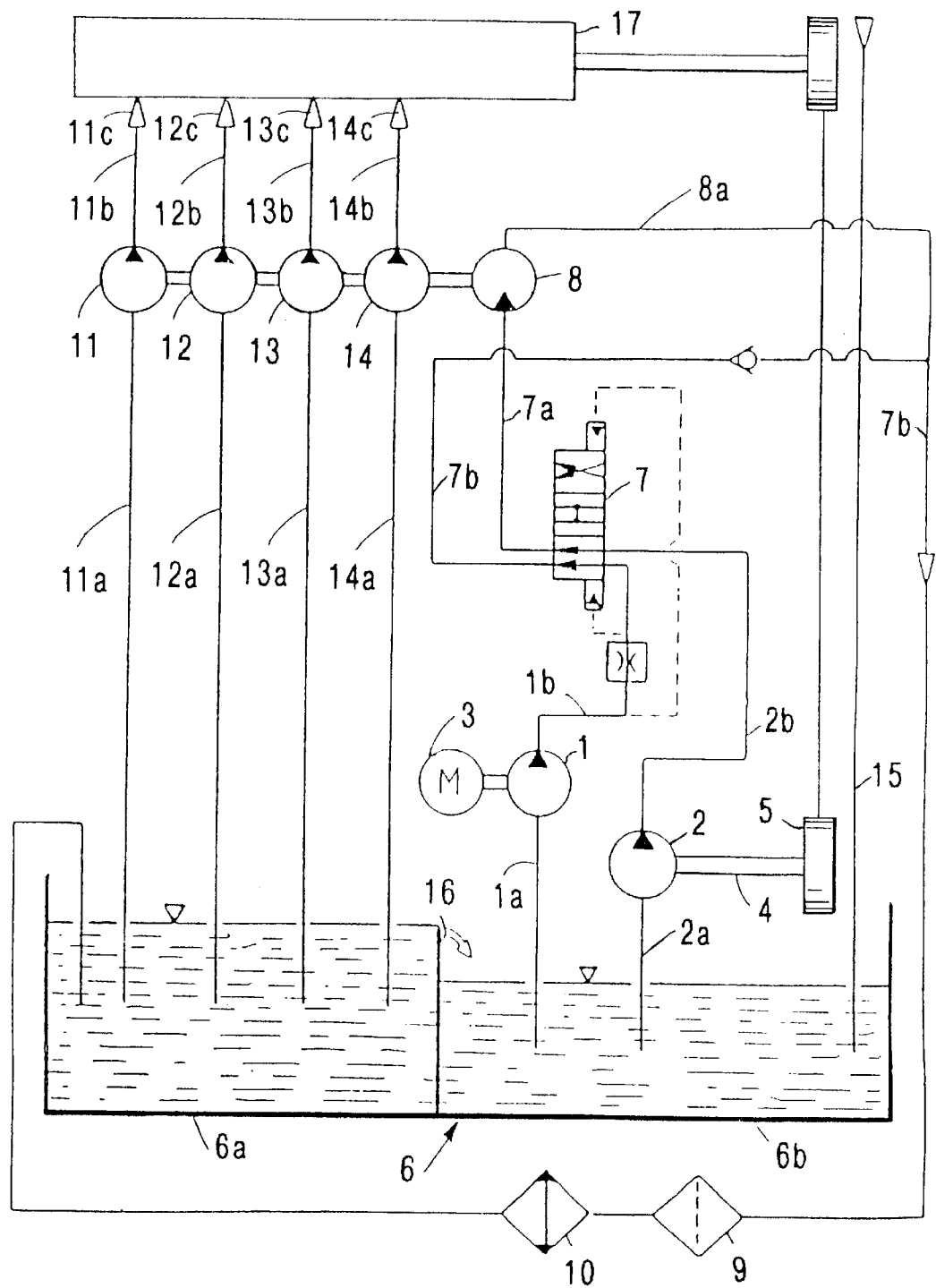

LUBRICANT SUPPLY SAFETY SYSTEM

BACKGROUND OF THE INVENTION

The present invention relates to a lubricant supply safety system for a machine, comprising a reservoir for lubricating oil, a hydraulic motor driving one or more feeder pumps supplying lubricating oil from said reservoir to various points in said machine, a first pump for supply of lubricating oil from said reservoir to drive said hydraulic motor under normal operating conditions, and a second pump for supply of lubricating oil from said reservoir to drive the hydraulic motor in the event of a failure of said first pump.

Even a very temporary absence of lubricating oil to an expensive piece of machinery can have devastating and expensive consequences. Several methods have therefore been developed to assure that lubricant will continue to be pumped to the machine even in the event of a pump breakdown or a power failure. This is particularly important in machines which require a long time period to stop due to a heavy moving mass or if they must be emptied of material being processed before they can be stopped. Two or more pumps, for example, can be arranged in parallel so that if one pump should fail, the other pump or pumps will continue to at least supply partial oil pressure to the machine. There is a disadvantage, however, that in a system with only two main pumps, the flow delivered in this failure situation will only be 50% of the normal operating pressure. Parallel backup systems have also been used which require mechanisms for the backup pump to kick in in the event of a failure of the normal pump. Such backup systems require that the backup pump be started immediately in the event of a failure of the first pump and that they have a power source, usually an electric motor which is intact and is supplied with electric current. In the event of an electrical power failure, a backup pump powered by an electric motor may be rendered useless. Also, one can never be 100% sure that a backup pump, which only kicks in in the event of a failure of the normal pump, will start running immediately and is in proper functioning order. Frequent tests are required in this case to maintain such backup reliability.

SUMMARY OF THE INVENTION

These disadvantages of the prior art are removed in a lubricant safety system as described by way of introduction which is characterized in that said second pump is continuously driven by said machine and is automatically engaged by means of a valve device to drive said hydraulic pump immediately upon detection of a malfunction of said first pump. A large piece of machinery with a large rotating mass, for example, or which must be emptied before it can be stopped may require a run-down time of 20 minutes more, and if the second pump is continuously driven via a belt whenever the machine is in motion, it will already be in operation when it is needed to supply high pressure oil to the hydraulic motor. Since said second pump is driven continuously, it will in a sense be continuously tested and any malfunctioning thereof can be immediately detected.

According to a preferred embodiment of the lubricant supply safety system according to the invention, the continuously driven second pump is connected via the valve device under normal operating conditions to a low-pressure line returning oil to said reservoir. Since the second pump is under normal operating conditions never loaded to supply high pressure, it will not be subjected to high-pressure stresses and can therefore be operated for very long time periods without any foreseeable problems.

Further advantages can be obtained by including in the low-pressure line an oil filter and an oil cooler. The second pump is therefore made use of during normal operation for the functions of filtering and cooling the oil. According to a further advantageous embodiment of the lubricant supply safety system according to the invention, added reliability is obtained by mechanically biasing the valve to move immediately to the fail-safe position when the first pump fails to deliver pressurized oil. This allows the safety system to be independent of any electrical current or electrical circuitry whatsoever.

According to another further embodiment of the invention, the lubricating oil reserve is divided into first and second compartments by means of an overflow barrier. The first and second pumps draw oil from the lower second compartment and the feeder pumps draw oil from the upper first compartment. Said low-pressure line leads to the upper first compartment. Thus, the purified and cooled lubricating oil, which is used to lubricate the machine, will not be mixed with the oil used to run the hydraulic motor.

The invention will be described below in more detail with reference to the accompanying drawing, which shows schematically the construction of a lubricant supply safety system according to the invention.

BRIEF DESCRIPTION OF THE DRAWINGS

FIG. 1 is a diagrammatic view of the lubricant supply safety system of the present invention.

DESCRIPTION OF THE PREFERRED EMBODIMENT

In the drawing, the numeral 1 designates a first pump driven by an electric motor 3, and the numeral 2 designates a pump connected by a belt or other connector 4 to a rotating component 5 of the machine 17 to be lubricated. The pumps 1 and 2, respectively, each communicate on the suction side via pipes 1a and 2a, respectively, with the warm oil section 66 of a lubricating oil reservoir, generally designated 6.

The pumps 1,2 are connected on the pressure side via lines 1b and 2b to a flow valve 7. Said valve has two positions, the first of which (the cross over represented in the upper half of the valve 7) is assumed when both pumps are in normal operation. Lubricating oil from the first pump 1 pressurizes the hydraulic motor 8 via a line 7a, and is returned via the lines 8a and 7b to the upper compartment of the oil reservoir 6. Oil is pumped from the reservoir by the pump 2 through the line 2b and the return line 7b in the normal operating position of the valve. This position is not shown in the drawing. This normal operating position can be symbolically visualized as the valve 7 being moved downwards by the pressure delivered by the pump 1. There is a low-pressure filter 9 and a low-pressure cooler 10 in the return line for filtering and cooling the return oil.

Should the first pump 1 normally driving the hydraulic motor 8 for some reason not deliver pressure to the line 1b, then the valve 7 will automatically assume the fail-safe position shown in the drawing. This may typically occur due to an electrical power failure, for example, but may occur due to other malfunctions of the pump. A piece of heavy rotating machinery may take quite some time to be brought to a standstill, and during this time it is crucial that it still be provided with lubricating oil. In the fail-safe position shown, the second pump now drives the hydraulic motor 8 at high pressure, thus assuring that the pumps 11–14 will supply the machine 17 with lubricating oil. Since the motor 2 normally runs at low pressure, it will have a long life and will be running at the very instant when it is needed to drive the hydraulic motor 8. There is thus no delay or uncertainty as to its operation.

The hydraulic motor 8 is operatively connected to a number of feeder pumps for supplying lubricating oil to the lubrication points of the machine 17. In the embodiment shown in the drawing there are four feeder pumps 11, 12, 13 and 14 which communicate on their suction sides via lines 11a, 12a, 13a, 14a with the upper compartment 6a of the lubricating oil reservoir 6 and communicate on the pressure side via lines 11b–14b with the lubrication points 11c, 12c, 13c, 14c of the machine 17. As was mentioned above the lubricating oil reservoir 6 is divided into two compartments 6a,6b. To the compartment 6b there is supplied via a line 15 new lubricant and from this compartment lubricating oil is drawn via the lines 1a,2a to the pumps 1 and 2. The line 7b supplies to the compartment 6a cold filtered lubricant. From there the filtered and cooled lubricant is pumped via the lines 11a–14a, the feeder pumps 11–14 and the lines 11b–14b to the lubrication points of the machine. Surplus lubricating oil in the compartment 6a overflows the barrier 16 into the compartment 6b.

It will be obvious to the person skilled in the art that the invention can be varied in a number of manners within the scope of the invention. For example, the number of feeder pumps and the number of hydraulic pumps are of course not limited to the numbers shown in the drawing.

I claim:

1. A lubricant supply safety system for a machine, comprising a reservoir (6) for lubricating oil, a hydraulic motor (8) driving one or more feeder pumps (11, 12, 13, 14) supplying lubricating oil from said reservoir to various points in said machine, a first pump (1) for supply of lubricating oil from said reservoir to drive said hydraulic motor (8) under normal operating conditions, a second pump (2) for supply of lubricating oil from said reservoir (6) to drive said hydraulic motor (8) in the event of a failure of said first pump (1), said second pump (2) being continuously driven by said machine and being automatically engaged by means of a valve device (7) to drive said hydraulic motor (8) immediately upon detection of a malfunction of said first pump (1).

2. The lubricant supply safety system according to claim 1, wherein said continuously driven second pump (2) is connected via said valve device (7) under normal operating conditions to a low-pressure line (7b) returning oil to said reservoir (6).

3. The lubricant supply safety system according to claim 2, wherein said low-pressure line (7b) includes a low-pressure oil filter (9).

4. The lubricant supply safety system according to claim 2, wherein said low-pressure line (7b) includes a low-pressure oil cooler (10).

5. The lubricant supply safety system according to claim 1 wherein said valve device (7) is biased to a fail-safe position connecting said second pump (2) to said hydraulic motor (8) when said detection of a malfunction is detection of an absence of pressure in the oil delivered by said first pump(1).

6. The lubricant supply safety system according to claim 1 wherein said second pump (2) is driven directly mechanically by said machine by means of a belt.

7. The lubricant supply safety system according to claim 2 wherein the lubricating oil reservoir is divided into a first (6a) and a second (6b) compartment by means of an overflow barrier (16), over which overflowing oil flows from the first (6a) to the second (6b) compartment, said first and second pumps (1, 2) drawing oil from said second compartment, said feeder pumps (11, 12, 13, 14) drawing oil from said first compartment (6a) and said low-pressure line (7b) leading to said first compartment (6a).

8. A lubricant supply safety system for a machine, comprising a reservoir (6) for lubricating oil, a hydraulic motor (8) driving one or more feeder pumps (11, 12, 13, 14) supplying lubricating oil from said reservoir to various points in said machine, a first pump (1) for supply of lubricating oil from said reservoir to drive said hydraulic motor (8) under normal operating conditions, a second pump (2) for supply of lubricating oil from said reservoir (6) to drive said hydraulic motor (8) in the event of a failure of said first pump (1), said second pump (2) being continuously driven by said machine and being automatically engaged by means of a valve device (7) to drive said hydraulic motor (8) immediately upon detection of a malfunction of said first pump (1), and wherein the lubricating oil reservoir is divided into a first (6a) and a second (6b) compartment by means of an overflow barrier (16), over which overflowing oil flows from the first (6a) to the second (6b) compartment, said first and second pumps (1, 2) drawing oil from said second compartment, said feeder pumps (11, 12, 13, 14) drawing oil from said first compartment (6a).

* * * * *